United States Patent

Kameoka et al.

[11] Patent Number: 5,936,681
[45] Date of Patent: Aug. 10, 1999

[54] VIDEO DISPLAY MONITOR EMPLOYING IMAGE INTERPOLATION

[75] Inventors: Fumlou Kameoka; Taro Funamoto; Takahisa Hatano; Yoshikuni Shindo, all of Sapporo, Japan

[73] Assignee: Matsushita Electric Industrial Co., Ltd., Osaka, Japan

[21] Appl. No.: 08/812,485

[22] Filed: Mar. 6, 1997

[30] Foreign Application Priority Data

Mar. 6, 1996 [JP] Japan .................................. 8-048603

[51] Int. Cl.⁶ ...................................................... H04N 5/21
[52] U.S. Cl. ..................... 348/625; 348/620; 364/474.31; 382/176; 382/300
[58] Field of Search ..................... 348/625, 609, 348/610, 618–621, 615, 616; 364/474.31; 382/219, 300, 275, 176

[56] References Cited

U.S. PATENT DOCUMENTS

| | | | |
|---|---|---|---|
| 4,635,119 | 1/1987 | Baker | 348/625 |
| 4,856,075 | 8/1989 | Smith et al. | 382/176 |
| 4,918,528 | 4/1990 | Oohashi | 348/625 |
| 4,994,915 | 2/1991 | Takahashi et al. | 348/625 |
| 5,023,919 | 6/1991 | Wataya et al. | 382/54 |
| 5,054,100 | 10/1991 | Tai | 382/300 |
| 5,151,787 | 9/1992 | Park | 348/625 |
| 5,168,375 | 12/1992 | Reisch et al. | 358/432 |
| 5,231,677 | 7/1993 | Mita et al. | 348/625 |
| 5,257,326 | 10/1993 | Ozawa et al. | 382/300 |
| 5,339,365 | 8/1994 | Kawai et al. | 382/176 |
| 5,543,859 | 8/1996 | Miyata et al. | 348/625 |
| 5,606,631 | 2/1997 | Weiss et al. | 382/275 |
| 5,623,558 | 4/1997 | Billawala et al. | 382/254 |
| 5,703,965 | 12/1997 | Fu et al. | 382/300 |

FOREIGN PATENT DOCUMENTS 8-287244  11/1996  Japan .

OTHER PUBLICATIONS

Society of Electronic and Communication Engineers, *Application of the Digital Signal Processing*, Published May 20, 1981, (with partial English translation).

*Primary Examiner*—Andrew I. Faile
*Assistant Examiner*—Reuben M. Brown
*Attorney, Agent, or Firm*—Ratner & Prestia

[57] ABSTRACT

A video display monitor employs interpolation which maintains sharpness in images which have large differences in signal levels of picture elements and assuring smoothness of images such as lamps which have small differences in signal levels. The difference in the signal level differences of respective adjacent picture elements is detected by delay and subtraction. A decoder produces a signal for interpolation based on the input of an interpolation coefficient and the absolute value of the interpolation coefficient which is output from an absolute value detector.

5 Claims, 6 Drawing Sheets

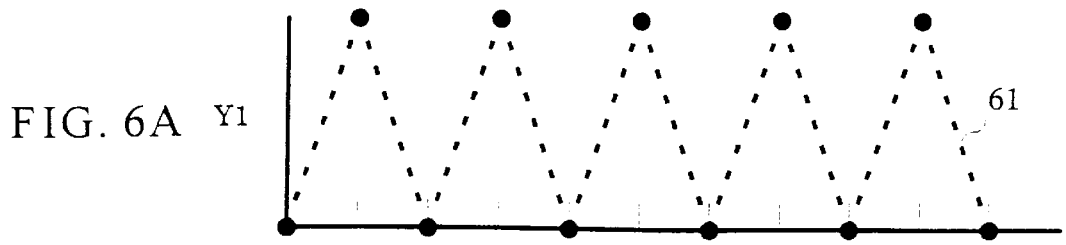
FIG. 6A Y1
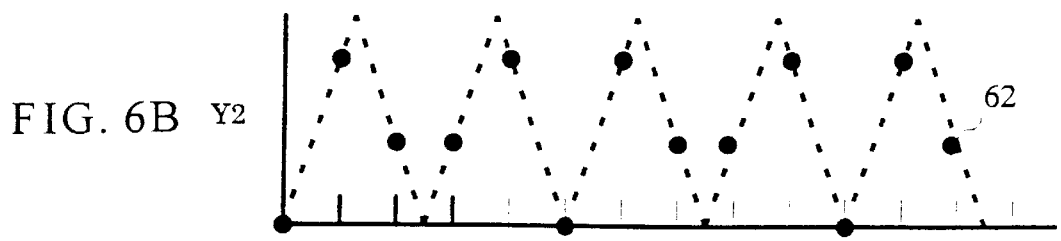
FIG. 6B Y2
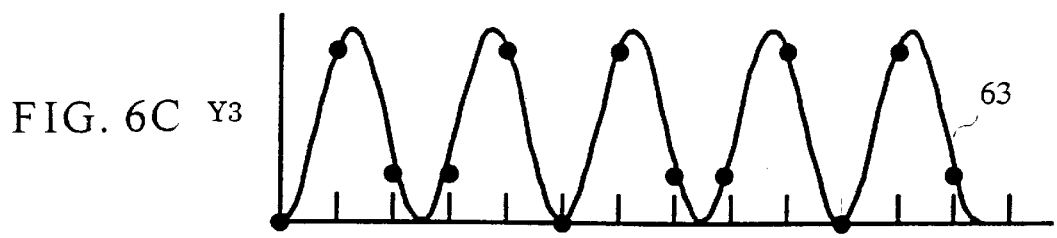
FIG. 6C Y3
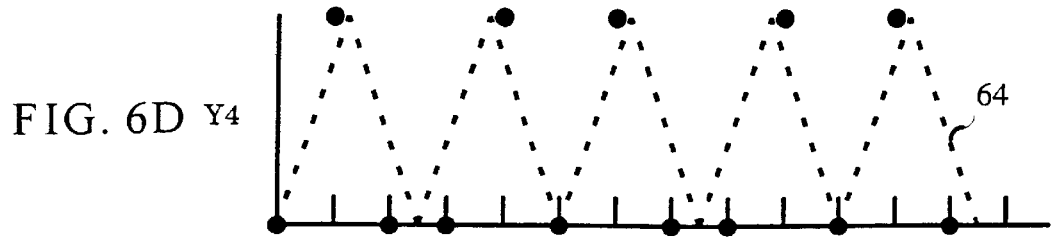
FIG. 6D Y4

VIDEO DISPLAY MONITOR EMPLOYING IMAGE INTERPOLATION

FIELD OF THE INVENTION

The present invention relates to the field of video display monitors and, more particularly, to video display monitors employing image interpolation in digital signal processing.

BACKGROUND OF THE INVENTION

Conventional video display monitors employing image interpolation in digital signal processing apply a specific interpolation coefficient for interpolation. Although it is known that a standard function of sinx/x is ideal for deciding an interpolation coefficient, linear interpolation has been adopted in order to simplify hardware configuration.

One conventional technology is explained below with reference to FIG. 7.

A digital video input signal 701, such as a luminance signal, from the outside, changes in accordance with a clock pulse. The digital video input signal 701 is delayed by delay circuits 71 and 72 as set by the clock pulse equivalent to an interpolating picture element. A subtractor 73 subtracts the output signal of the delay circuit 72 from the output signal of the delay circuit 71, and produces the output of the difference in signal levels; or in other words, the difference in signal levels of adjacent picture elements. A multiplier 74 multiplies the above mentioned difference in the signal levels by an interpolation coefficient 702, specifying an interpolation point which is input from the outside, and produces an interpolation signal. An adder 75 adds the output signal of the delay circuit 72 and the output signal of the multiplier 74, and produces a video output signal 703. Since this video output signal 703 is the result of the difference in the signal levels of the adjacent picture elements multiplied by the interpolation coefficient specifying the interpolation point, it can be said that the conventional technology employs linear interpolation.

Using the above system, however, images such as text lose sharpness because they have large difference in signal levels of picture elements. Linear interpolation of such images results in sloped signal edges. If, for example, a step function which is advantageous for interpolating signals for text and the like, is applied to the interpolation coefficient, images of objects such as lamps, for example, acquire jagged edges because they have signal levels with shallow slopes. Moreover, images such as every other vertical or horizontal line comprising high frequency signals may produce a large beat.

SUMMARY OF THE INVENTION

The present invention provides a video display monitor which 1) reduces beating of images comprising high frequency signals, 2) maintains sharpness in images like text whose signals have a large difference in signal levels of picture elements, and 3) assures smoothness of images, such as lamps, whose signals have a small difference in signal levels.

To solve disadvantages of conventional video display monitors, the present invention relates to a video display monitor employing interpolation of a new picture element of the video signal between picture elements of digital video input signals. The difference in signal levels of adjacent picture elements is detected, and the signal level of a picture element to be interpolated between adjacent picture elements is nonlinearly converted. The present invention employs nonlinear interpolation (e.g. the cosine function) which is particularly effective for images comprising high frequency signals such as every other vertical or horizontal line, for example.

The present invention also relates to a video display monitor applying the cosine function for nonlinear conversion of the signal level of an interpolating picture element. Application of the cosine function to nonlinear interpolation thus enables reduction of beating of images comprising high frequency signals.

The present invention also relates to a video display monitor employing interpolation of a new picture element of the video signal between picture elements of digital video input signals, which detects the difference in the signal level differences of respective adjacent picture elements and selects a method for converting the signal level of an interpolating picture element depending on the degree of the difference in the respective signal level differences. When the difference in the signal level differences exceeds a predetermined value, a signal for nonlinear interpolation (step) is produced. When the difference is below the predetermined value, a linear interpolation signal is produced.

Nonlinear interpolation thereby maintains the sharpness of images, such as text, comprising large difference in signal levels of picture elements. At the same time, linear interpolation assures the smoothness of images of objects such as lamps, for example, comprising small differences in signal levels.

The present invention further relates to a video display monitor comprising a delay means for delaying a digital video signal, an operation means for calculating the difference in signal levels using the delay means, a conversion means for converting a signal nonlinearly, a multiplication means for multiplying the output signal of the conversion means by the output signal of the operation means, and an addition means for adding the output signal of the multiplication means and the output signal of the delay means. In addition, a cosine function conversion table is applied to the nonlinear conversion of a signal in the above invention for reducing the beating of images comprising high frequency signals.

The present invention also relates to a video display monitor employing a cosine function conversion table for nonlinearly converting a signal.

The present invention further relates to a video display monitor comprising a first delay means for delaying a digital video signal, a second delay means for further delaying the output signal of the first delay means, a first operation means for calculating the difference in the output signals of the first delay means and the second delay means, a third delay means for further delaying the output signal of the first operation means, a second operation means for calculating the difference in the output signals of the first operation means and the third delay means, a means for deciding the absolute value of the output signal of the second operation means, a selection means for selecting and outputting an interpolation coefficient depending on the output of the means for deciding the absolute value, a multiplication means for multiplying the output of the selection means by the output of the third delay means, a fourth delay means for further delaying the output signal of the second delay means, and an addition means for adding the output signals of the fourth delay means and the multiplication means. Based on said absolute value, the smoothness of images comprising small difference in signal levels of adjacent picture elements is assured.

The present invention finally relates to a video display monitor comprising a first delay means for delaying a digital video signal, a second delay means for further delaying the output signal of the first delay means, an operation means for calculating the difference in the output signals of the first delay means and the second delay means, a selection means for converting and outputting an interpolation coefficient employing a cosine function conversion table, a multiplication means for multiplying the output of the selection means by the output of the operation means, and an addition means for adding the output signals of the second delay means and the multiplication means, thereby assuring sharp and smooth images.

BRIEF DESCRIPTION OF THE DRAWINGS

FIGS. 6A–6D show a 5/4 interpolation when every other vertical line (horizontal line) is interpolated using a range of interpolation methods.

DESCRIPTION OF THE PREFERRED EMBODIMENTS

First Exemplary Embodiment

Figure 1:
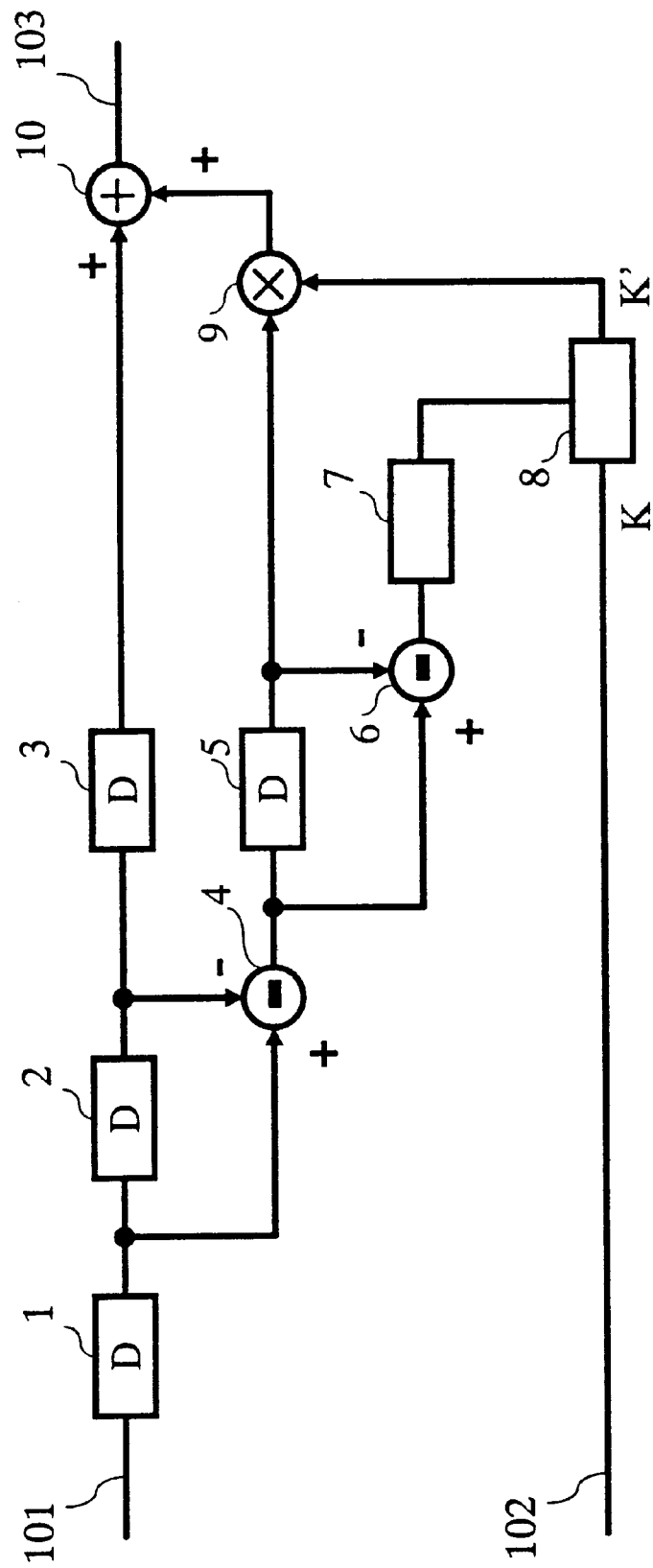
FIG. 1 is a block diagram of a video display monitor of a first exemplary embodiment of the present invention.

In FIG. 1, a video input signal 101 such as a digital luminance signal is input from an external source. Video input signal 101 is delayed by delay circuit 1 in accordance with a clock pulse equivalent to a picture element to be interpolated. Delay circuit 2 further delays the signal for one picture element, and delay circuit 3 delays the signal for one more picture element. Subtractor 4 subtracts the output of delay circuit 2 from the output of delay circuit 1. In other words, the difference in signal levels of adjacent picture elements is output by subtractor 4. Delay circuit 5 delays the output signal of the difference in signal levels for one picture element. Subtractor 6 subtracts the output signal of delay circuit 5 from the signal of the difference in signal levels. In other words, the difference in the signal level differences of respective adjacent picture elements is detected and output from subtractor 6. Absolute value detecting circuit 7 outputs the absolute value of the signal of the difference in the signal level differences. An interpolation coefficient K which is input from an external source is between 0 and 1 is related to the interpolation point. Decoder 8 selects and outputs an appropriate interpolation coefficient K' (either linear interpolation or nonlinear interpolation; K'=0 to 1) based on the interpolation coefficient K which has been input and the absolute value of interpolation coefficient K. Multiplier 9 multiplies the output signal of delay circuit 5 by the appropriate interpolation factor K' output from decoder 8. Adder 10 adds the output of delay circuit 3 and the output of multiplier 9 to produce video output signal 103.

How decoder 8 in FIG. 1 converts an interpolation coefficient from K to K' is described below with reference to FIGS. 2 and 3.

Figure 2:
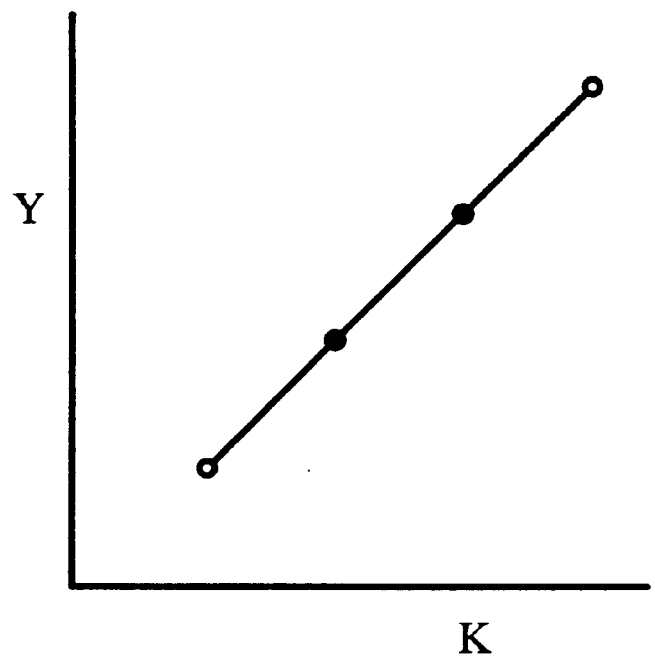
FIG. 2 is a conceptual drawing of linear interpolation.

FIG. 2 illustrates an example of linear interpolation. The position of adjacent picture elements is plotted along abscissa K and the luminance signal level along ordinate Y. White circles indicate unprocessed signals of two adjacent picture elements, and black circles indicate interpolated signals. Unprocessed signals of the two adjacent picture elements are linearly connected and interpolated by adding two additional picture elements in between. By the use of linear interpolation, unprocessed signals are converted into smoother signals.

Figure 3:
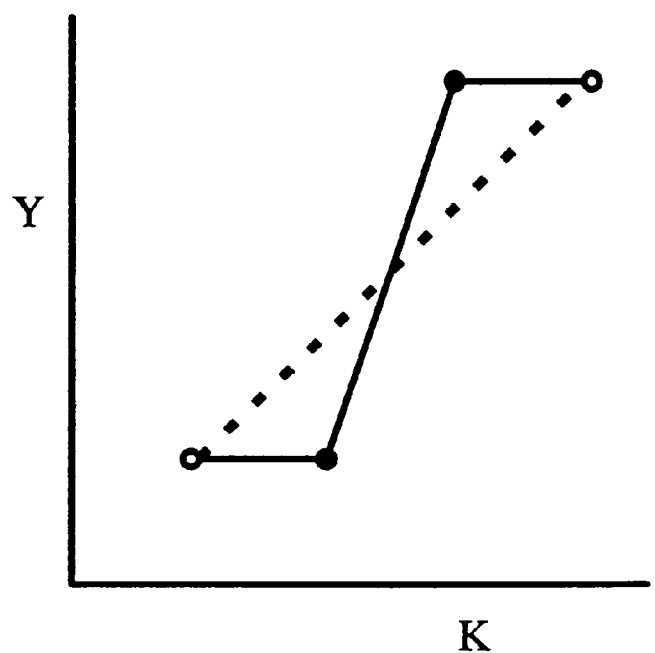
FIG. 3 is a conceptual drawing of nonlinear interpolation (step).

FIG. 3 illustrates an example of step interpolation which involves nonlinear interpolation. The position of adjacent picture elements is plotted along abscissa K and the luminance signal level along ordinate Y. White circles indicate unprocessed signals of two adjacent picture elements and black circles indicate interpolated signals. Unprocessed signals of the two adjacent picture elements are interpolated in a stepwise and nonlinear manner. By the use of step interpolation, unprocessed signals are converted into sharper signals.

Decoder 8 in FIG. 1 produces a signal for nonlinear interpolation (step) when the output of absolute value detecting circuit 7 is greater than a predetermined value, and produces a signal for linear interpolation when the output is smaller than the predetermined value. In this way, the sharpness of images, such as text for example, comprising signals with large difference in signal levels of picture elements, can be maintained with the use of nonlinear interpolation as seen in FIG. 3. At the same time, the smoothness of images such as lamps, for example, comprising signals with small differences in signal levels, can be attained with the use of linear interpolation as seen in FIG. 2.

Second Exemplary Embodiment

Figure 4:
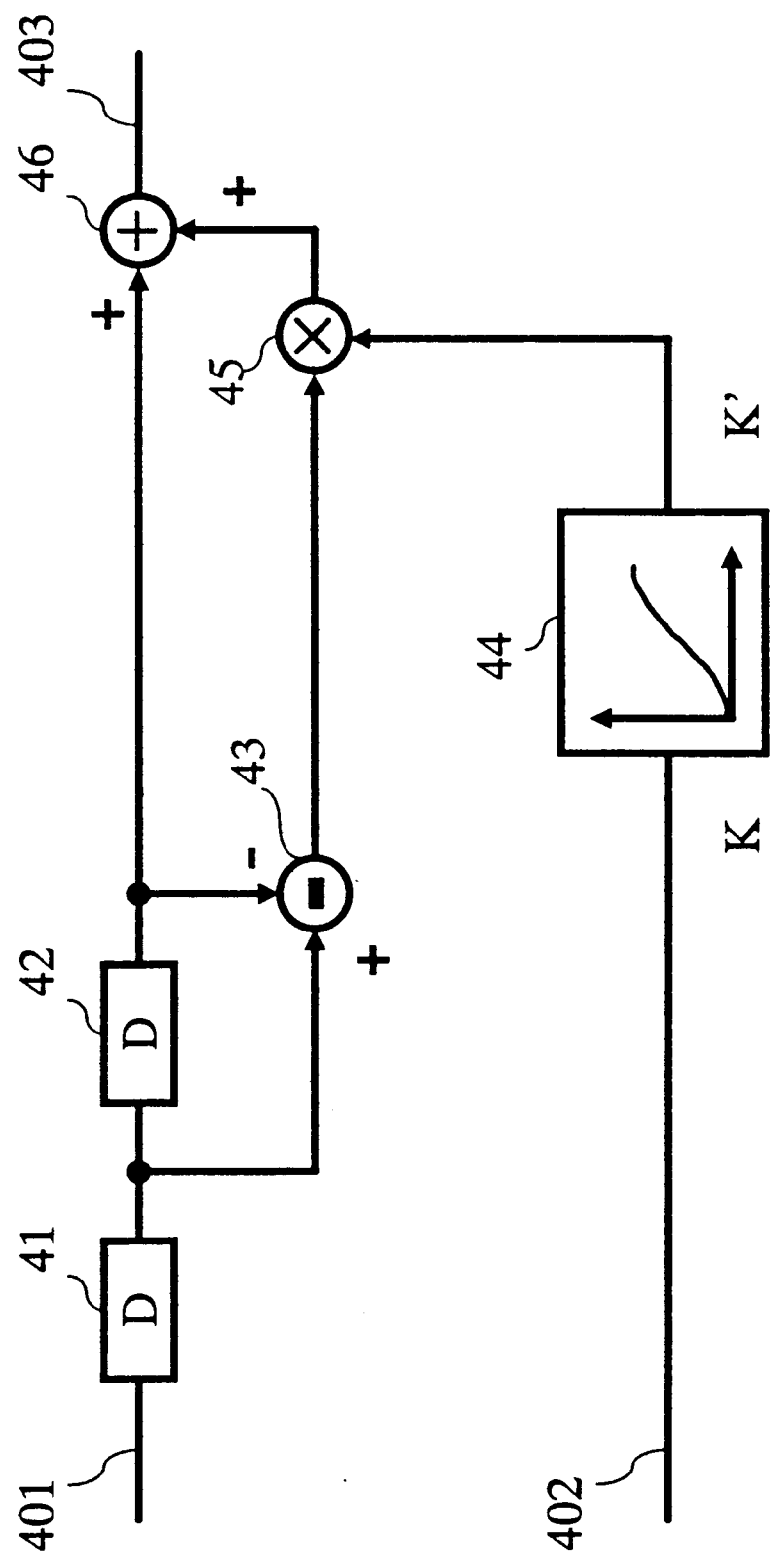
FIG. 4 is a block diagram of a video display monitor employing the cosine function of a second exemplary embodiment of the present invention.
Figure 5:
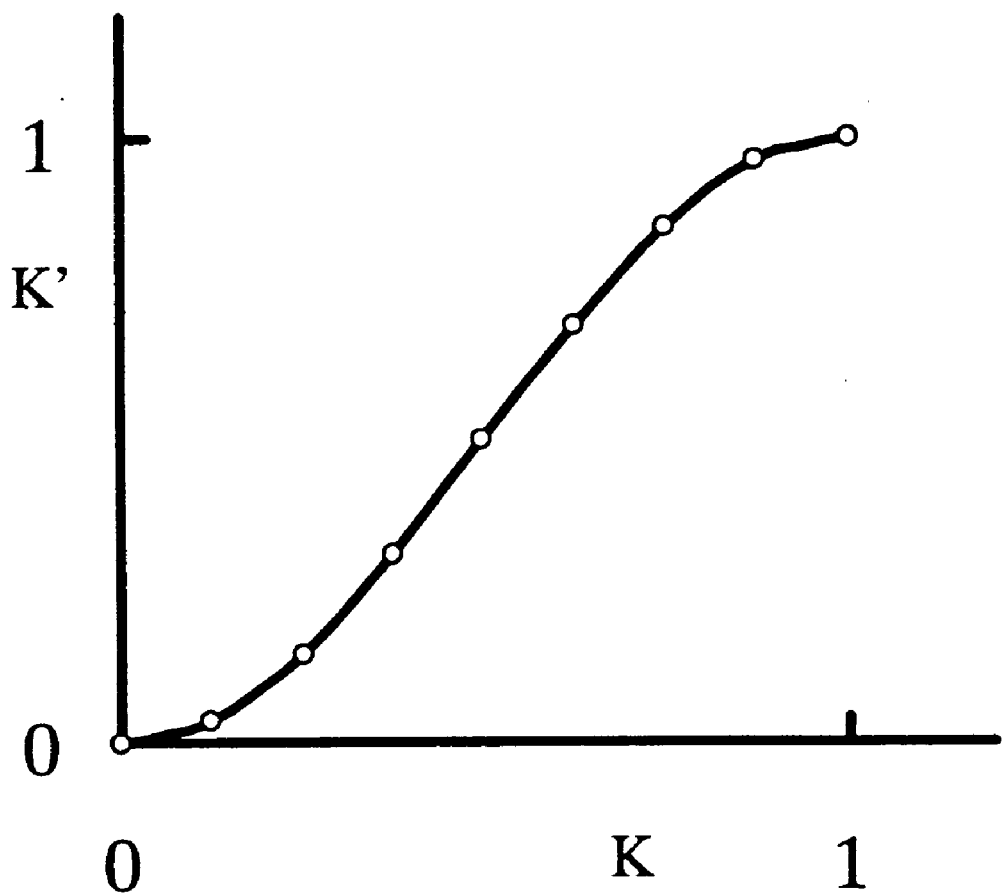
FIG. 5 is a graph illustrating a cosine interpolation table.
Figure 7:
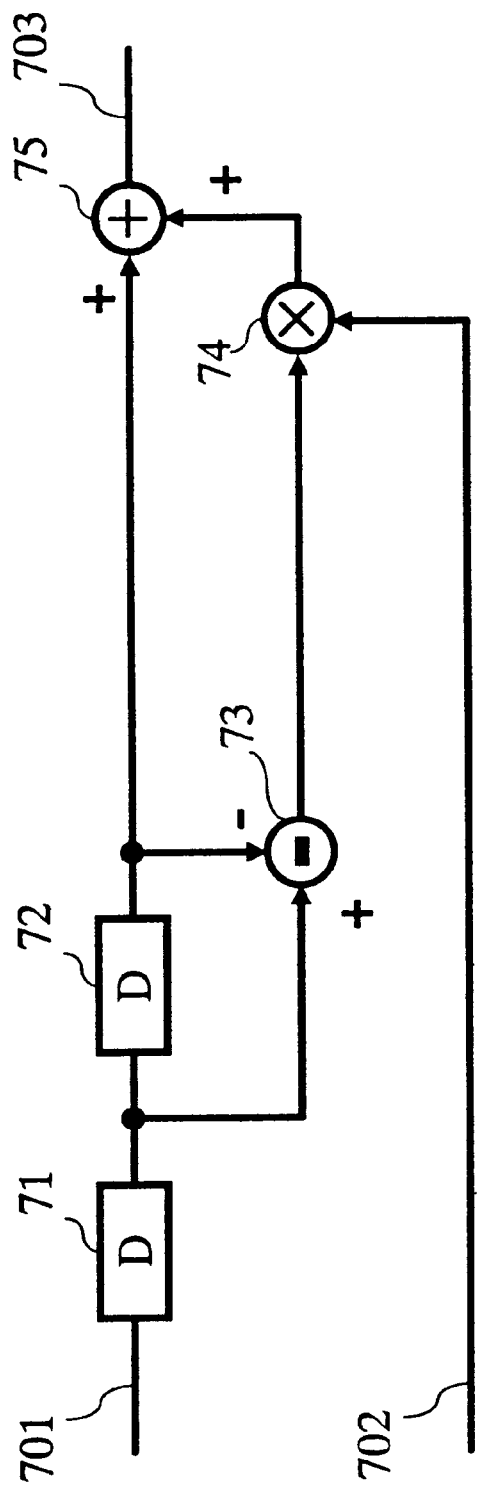
FIG. 7 is a block diagram of a conventional video display monitor.

In FIG. 4, delay circuit 41 delays the digital video input signal 401, input from an external source, for a time period representing one picture element, and delay circuit 42 delays the signal for an additional picture element. Subtractor 43 subtracts the output signal of delay circuit 42 from the output signal of delay circuit 41, and produces a signal consisting of the difference in signal levels of the adjacent picture elements. Interpolation coefficient 402 is input from an external source, and decoder 44 converts interpolation coefficient K (K=0 to 1) by applying the cosine function, and produces a converted interpolation coefficient K' (K'=0 to 1). FIG. 5 is a graph of the cosine curve as illustrated in the conversion table:

$$K'=0.5\text{COS}(\pi+\pi K)+0.5$$

Multiplier 45 multiplies the output of decoder 44 by the output of subtractor 43 which is the difference in signal levels from delay circuits 41 and 42 respectively. Adder 46 adds the output signals of multiplier 45 and delay circuit 42, to produce video output signal 403.

FIGS. 6A–6D are conceptual drawings which illustrate the effect on luminance signals when unprocessed signals are converted by 5/4 interpolation employing a range of interpolation methods. In each of FIGS. 6A–6D, the same picture element position K is plotted iteratively along the abscissa, and the signal level along the ordinate. FIG. 6A shows the signal level of unprocessed luminance signals Y1; FIG. 6B shows the luminance signals after linear interpolation (balanced interpolation) Y2; FIG. 6C shows the luminance signals after cosine interpolation Y3; and, FIG. 6D shows luminance signals after step interpolation Y4. Lines 61, 62, and 64 connect two adjacent unprocessed signals. Curve 63 in FIG. 6C interpolates unprocessed signals employing the cosine function. It will be seen by referring to FIGS. 6A–6D that the sharpness of images such as text, for example, which have large difference in signal levels of picture elements, can be maintained by nonlinear interpolation, and the smoothness of images such as lamps, for example, which have small differences in signal levels can be assured by linear interpolation.

Display devices employing the present invention enable interpolation for maintaining the sharpness of images when signals having large difference in signal levels of picture elements such as text are input, and for assuring the smoothness of images when signals having small difference in signal levels such as lamps are input. Moreover, image beat can be reduced when high frequency signals such as every other vertical or horizontal line are input.

Although the preferred embodiments refer to a digital luminance signal as a video input signal, they may alternately be component signals such as RGB and YIQ and all other types of signals. The present invention may be practiced or embodied in other ways. The preferred embodiments described herein are therefore illustrative and not restrictive, the scope of the invention being indicated by the appended claims, and all modifications which come within the true spirit of the claims are intended to be embraced therein.

What is claimed is:

1. A method for displaying a digital video signal on a video display monitor, said method comprising the steps of:

detecting a difference in signal levels of adjacent picture elements of said digital video signal;

interpolating said adjacent picture elements to provide an interpolating picture element based on an equation $$K'=0.5COS(\pi+\pi K)+0.5$$

where K' is a converted interpolation coefficient,
   K is an interpolation coefficient, and
   COS is a cosine function, when said difference in signal levels of said adjacent picture elements is greater than a predetermined value;

determining signal levels of said interpolating picture element based on said difference in signal levels of said adjacent picture elements; and displaying an interpolated video signal on said video display based upon said difference in signal levels of said adjacent picture elements.

2. A method for displaying a digital video signal on a video display monitor, said method using interpolation of a new picture element of the digital video signal between adjacent picture elements of the digital video input signal, said method comprising the steps of:

detecting a difference in signal levels of said adjacent picture elements;

converting the signal level of an interpolating picture element based on an equation $$K'=0.5COS(\pi+\pi K)+0.5$$

where K' is a converted interpolation coefficient,
   K is an interpolation coefficient, and
   COS is a cosine function; and displaying an interpolated video signal on said video display.

3. A video display monitor for use with a digital video signal comprising:

delay means for delaying the digital video signal to produce a delayed digital video signal;

operation means for calculating a difference in signal levels of the digital video signal and the delayed digital video signal, conversion means for converting an interpolation coefficient into a converted interpolation coefficient based on i) an equation $$K'=0.5COS(\pi+\pi K)+0.5$$

where K' is the converted interpolation coefficient,
   K is the interpolation coefficient, and
   COS is a cosine function, and ii) said difference in signal levels calculated by said operation means;

multiplication means for multiplying an output signal of said conversion means by an output signal of said operation means;

addition means for adding an output signal of said multiplication means and an output signal of said delay means; and display means for displaying an output signal of said addition means.

4. A video display monitor for use with a digital video signal comprising:

first delay means for delaying the digital video signal;

second delay means for further delaying an output signal of said first delay means;

first operation means for calculating a first difference in the output signal of the first delay means and an output signal of the second delay means;

third delay means for further delaying an output signal of said first operation means;

second operation means for calculating a second difference in the output signal of said first operation means and an output signal of said third delay means;

determining means for determining an absolute value of an output signal of said second operation means;

selection means for converting an interpolation coefficient into a converted interpolation coefficient based on an equation $$K'=0.5COS(\pi+\pi K)+0.5$$

where K' is the converted interpolation coefficient,
   K is the interpolation coefficient, and
   COS is a cosine function;

multiplication means for multiplying an output of said selection means by the output of said third delay means;

fourth delay means for further delaying the output signal of said second delay means;

addition means for adding an output signal of said fourth delay means and an output signal of said multiplication means; and display means for displaying an output signal of said addition means.

5. A video display monitor for use with a digital video signal comprising:

first delay means for delaying the digital video signal;

second delay means for further delaying an output of said first delay means;

operation means for calculating the difference in the output signal of said first delay means and an output signal of said second delay means;

selection means for converting an interpolation coefficient into a converted interpolation coefficient based on an equation $$\text{i } K'=0.5COS(\pi+\pi K)+0.5$$

where K' is the converted interpolation coefficient,
K is the interpolation coefficient, and COS is a cosine function;

multiplication means for multiplying an output of said selection means by an output of said operation means;

addition means for adding the output signal of said second delay means and an output signal of said multiplication means; and display means for displaying an output signal of said addition means.

* * * * *

UNITED STATES PATENT AND TRADE MARK OFFICE
CERTIFICATE OF CORRECTION

PATENT NO.   : 5,936,681
DATED        : August 10, 1999
INVENTOR(S)  : Kameoka et al.

It is certified that error appears in the above-identified patent and that said Letters Patent is hereby corrected as shown below:

Column 7, line 7, "i K'=0.5COS($\pi+\pi$K)+0.5" should read
--K'=0.5COS($\pi+\pi$K)+0.5--.

Signed and Sealed this

Twenty-fifth Day of April, 2000

Attest:

Q. TODD DICKINSON

*Attesting Officer*     Director of Patents and Trademarks